United States Patent [19]
Maley et al.

[11] Patent Number: 5,494,219
[45] Date of Patent: Feb. 27, 1996

[54] FUEL INJECTION CONTROL VALVE WITH DUAL SOLENOIDS

[75] Inventors: Dale C. Maley, Fairbury; Ronald D. Shinogle, Peoria; Mark F. Sommars, Sparland, all of Ill.; Oded E. Sturman, Newbury Park, Calif.

[73] Assignee: Caterpillar Inc., Peoria, Ill.

[21] Appl. No.: 252,943

[22] Filed: Jun. 2, 1994

[51] Int. Cl.⁶ .................................................. F02M 51/06
[52] U.S. Cl. ........................................... 239/88; 251/129.1
[58] Field of Search ................... 239/88–96; 251/129.1; 335/220, 229, 253, 266, 268

[56] References Cited

U.S. PATENT DOCUMENTS

| | | | |
|---|---|---|---|
| 2,144,862 | 1/1939 | Truxell | 239/88 |
| 2,552,445 | 5/1951 | Nielsen | 259/456 |
| 2,621,011 | 12/1952 | Smith | 251/27 |
| 2,916,048 | 12/1959 | Gunkel | 137/544 |
| 3,532,121 | 10/1970 | Sturman et al. | 137/625.4 |
| 3,570,806 | 3/1971 | Sturman et al. | 251/65 |
| 3,570,807 | 3/1971 | Sturman et al. | 251/65 |
| 3,570,833 | 3/1971 | Sturman et al. | 267/161 |
| 3,585,547 | 6/1971 | Sturman et al. | 335/227 |
| 3,604,959 | 9/1971 | Sturman | 310/12 |
| 3,683,239 | 8/1972 | Sturman | 317/150 |
| 3,743,898 | 7/1973 | Sturman | 317/154 |
| 3,753,547 | 8/1973 | Topham | 251/120 |
| 3,814,376 | 8/1972 | Reinicke | 251/129 |
| 3,821,967 | 7/1974 | Sturman et al. | 137/624.15 |
| 3,835,829 | 9/1974 | Links | 123/139 E |
| 3,989,066 | 11/1976 | Sturman et al. | 137/624.2 |
| 4,107,546 | 8/1978 | Sturman et al. | 307/141 |
| 4,108,419 | 8/1978 | Sturman et al. | 251/30 |
| 4,114,647 | 9/1978 | Sturman et al. | 137/624.2 |
| 4,114,648 | 9/1978 | Nakajima et al. | 137/625.5 |
| 4,248,270 | 2/1981 | Ostrowski | 138/45 |
| 4,275,693 | 6/1981 | Leckie | 239/89 |
| 4,392,612 | 7/1983 | Deckard et al. | 239/88 |
| 4,409,638 | 10/1983 | Sturman et al. | 361/152 |
| 4,482,094 | 11/1984 | Knape | 239/88 |
| 4,501,290 | 2/1985 | Sturman et al. | 137/495 |
| 4,516,600 | 5/1985 | Sturman et al. | 137/495 |
| 4,518,147 | 5/1985 | Andresen et al. | 251/121 |
| 4,526,519 | 7/1985 | Mowbray et al. | 417/490 |
| 4,541,454 | 9/1985 | Sturman et al. | 137/505 |
| 4,558,844 | 12/1985 | Donahue et al. | 251/118 |
| 4,653,455 | 3/1987 | Eblen et al. | 123/506 |
| 4,690,371 | 9/1987 | Bosley et al. | 251/129.1 X |
| 4,702,212 | 10/1987 | Best et al. | 123/472 |
| 4,749,167 | 6/1988 | Gottschall | 251/129.1 X |
| 4,794,890 | 1/1989 | Richeson, Jr. | 123/90.11 |
| 4,811,221 | 3/1989 | Sturman et al. | 364/420 |
| 4,813,599 | 3/1989 | Greiner et al. | 239/456 |
| 4,829,947 | 5/1989 | Lequesne | 251/129.1 X |
| 4,831,989 | 5/1989 | Haines | 123/506 |
| 4,846,440 | 7/1989 | Carlson et al. | 251/129.17 |
| 4,883,025 | 11/1989 | Richeson, Jr. | 251/129.1 X |
| 4,964,571 | 10/1990 | Taue et al. | 239/88 |
| 4,993,637 | 2/1991 | Kanesaka | 239/96 |
| 5,050,543 | 9/1991 | Kawamura | 123/90.11 |
| 5,121,730 | 6/1992 | Ausman et al. | 123/467 |
| 5,131,624 | 7/1992 | Kreuter et al. | 251/129.18 |
| 5,199,392 | 4/1993 | Kreuter et al. | 251/129.1 X |
| 5,350,153 | 9/1994 | Moringo et al. | 251/129.1 X |

FOREIGN PATENT DOCUMENTS 0246373  3/1992  European Pat. Off. .

OTHER PUBLICATIONS

Sturman, "Breakthrough in Digital Valves", *Machine Design*, vol. 66, No. 4, Feb. 21, 1994, pp. 37–42.

Primary Examiner—Andres Kashnikow
Assistant Examiner—Lesley D. Morris
Attorney, Agent, or Firm—Marshall, O'Toole, Gerstein, Murray & Borun

[57] ABSTRACT

A control valve assembly adapted for a fuel injector includes a valve seat with fluid inlet and fluid outlet. A poppet valve controls the flow of fluid through the valve seat. A pair of electrical actuators are selectively operably energized for releasing the poppet and moving the poppet to valve open and closed positions. Split fuel injection can be provided using either sequential operation or concurrent operation, i.e., phasing. Permanent magnets, holding current and residual magnetism enable the latching of the poppet valve in each of the valve open and closed positions.

37 Claims, 9 Drawing Sheets

FUEL INJECTION CONTROL VALVE WITH DUAL SOLENOIDS

TECHNICAL FIELD

The present invention relates generally to fuel injection systems and, more particularly, to electronically-controlled fuel injectors and pressure control valves therefor.

BACKGROUND ART

An example of an electrically-controlled unit fuel injector is shown in U.S. Pat. No. 4,392,612 issued to Deckard, et al. on Jul. 12, 1983. In Deckard, et al. the injector includes a mechanically-actuated fuel pumping plunger and an electrically-actuated fuel pressure control valve assembly. The pressure control valve assembly includes a solenoid-operated poppet valve that controls fuel pressure in the unit injector in order to control fuel injection delivery. Fuel pressure is controllably enabled to be developed within the injector by electrical actuation of the pressure control valve assembly. Fuel pressure is controllably prevented from developing within the injector by not electrically actuating the pressure control valve assembly.

In such electronically-controlled unit injectors, the solenoid is electrically energized in response to an electronic control module and the armature of the pressure control valve assembly moves the poppet valve in one direction until it engages a valve seat. The solenoid is maintained electrically energized and holds the poppet valve in the fuel sealing position to enable fuel pressure to be developed in the unit injector, eventually resulting in fuel injection when a predetermined valve opening pressure (VDP) is reached. At the end of the fuel injection cycle, the solenoid is electrically deenergized and a return spring backs the poppet valve off of the valve seat and returns the poppet valve to the valve open position which prevents the development of fuel pressure by spilling the fuel back to the fuel reservoir.

Several problems have been noted in these presently available pressure control valve assemblies and it is desired to seek solutions thereto. First of all, the electronic control module or associated driver(s) must supply sufficient power to the solenoid coil to maintain the poppet valve in the fuel sealing position so that fuel injection can be achieved. It is desired to minimize the holding power requirements not only because this would lessen the energy required, but also to achieve faster valve opening.

Secondly, presently available pressure control valve assemblies are slow to close because the electromagnetic force produced by the electrical solenoid coil must overcome the return spring force to close the poppet valve. The return spring force is relatively constant during the stroke of the poppet valve because the stroke is relatively small and therefore continually opposes the electromagnetic coil force acting to move the poppet valve toward closure.

Also, presently available pressure control valve assemblies require a relatively large number of piece parts so that they are expensive to manufacture and slow in operation. Furthermore, the relatively large number of piece parts in presently available units tends to increase manufacturing costs and reduce reliability.

Because currently available fluid control valves are relatively slow, they can not give fast enough responses to meter very small quantities of fuel per injector stroke. Split fuel injection, which is desired because it improves engine thermal efficiency, reduces engine noise emissions, and lowers the emission of undesired oxides of nitrogen ($NO_x$), requires metering very small quantities of fuel. Therefore current fluid control valves can not provide the desired split fuel injection.

The present invention is directed to overcoming one or more of the problems as set forth above.

DISCLOSURE OF THE INVENTION

In one aspect of the present invention, an electronically-controlled pressure control valve assembly for a fuel injector includes a valve seat, a movable valve member for controlling the flow of fuel through sealing contact with the valve seat, respective permanent magnets to latch the valve member at opposite valve positions, and a pair of electrical actuators, such as electrical solenoids for releasing the valve member from its latched position and moving the valve member toward its opposite valve position. The respective permanent magnets provide a magnetic field coupled to the valve member and of a sufficient magnetic force to latch the valve member when the valve member is positioned at one of the opposite valve positions.

Preferably, the valve member is a poppet valve which can be latched in the upmost position so that the valve seat is opened thereby preventing fuel injection from occurring. In the opposite valve seated position, the poppet valve is in the downmost position in sealing engagement with the valve seat so that fuel injection can be initiated for a fuel injection cycle. The respective permanent magnets create a latching magnetic field of sufficient magnetic force to maintain the poppet valve latched in either the top valve position or the bottom valve position.

If for instance the poppet valve is latched in the top valve position so that the valve seat is opened, the top electrical actuator is operatively enabled to supply a suitable magnetic field countering the latching magnetic field from the permanent magnet which is holding the poppet valve in the top valve position. The bottom electrical actuator also is operably energized to provide a suitable magnetic field of sufficient magnetic potential to move the poppet valve from the top valve position to the bottom valve position where the valve seat is closed to eventually result in fuel injection. The bottom permanent magnet now provides the latching magnetic field for latching the poppet valve in the bottom valve position. An important advantage of the present invention is that neither the top electrical actuator nor the bottom electrical actuator is energized when the poppet valve is latched in the top and bottom valve positions by the respective permanent magnet, thereby lowering the required energy to be supplied from the engine control module.

To end fuel injection, the bottom electrical actuator is operably energized to provide a sufficient magnetic field so as to release the poppet valve from its bottom latched position. The top electrical actuator is operably energized to provide a magnetic field sufficient to move the poppet valve off the valve seat and towards the top poppet valve position where the top permanent magnet will hold the poppet valve in the latched top valve position.

In a preferred embodiment of the invention, a first electromagnetic device, such as a top solenoid coil, and a second electromagnetic device, such as a bottom solenoid coil, are utilized in conjunction with respective permanent magnets, where the permanent magnets latch the poppet valve in the opposite poppet valve positions. To begin the fuel injection, an operating voltage applied to the top solenoid coil creates a magnetic field which begins to cancel the magnetic field created by the upper permanent magnet so as to release the poppet valve from the latched top valve position. Voltage is also applied to the lower solenoid coil sufficient to create a magnetic field and to begin to pull the poppet valve downwards and the voltage to the top coil is then stopped. Voltage applied to the lower solenoid coil is maintained until the poppet valve contacts the valve seat and the voltage to the lower solenoid coil is then removed. The lower permanent magnet now latches the poppet valve against the valve seat.

In this position of the poppet valve, the fuel is blocked from passing through the valve seat so that injection pressure can begin to build as the plunger continues downwards. When the appropriate VDP pressure has been reached, the nozzle check valve opens and fuel is injected into the combustion chamber.

To end fuel injection, operating voltage is applied to the lower solenoid coil with the appropriate polarity to create a magnetic field sufficient to cancel the latching field created by the lower permanent magnet. This tends to release the poppet valve from the latched lower position. An operating voltage is also applied to the upper solenoid coil with the appropriate polarity to create a magnetic field sufficient to enable the poppet valve to be moved upwards towards the top valve position and the poppet valve will begin to move upwards. Once the valve seat area is opened slightly, fluid flow across the seat area of the poppet valve creates an upwards force to improve the poppet valve opening response time.

The operating voltage to the bottom solenoid coil is then stopped. Operating voltage to the upper solenoid coil is maintained until the poppet valve reaches the top poppet valve position, and the voltage to the upper solenoid coil is then removed. The upper permanent magnet now latches and holds the poppet valve in the top valve position. When the poppet valve begins to back away from the valve seat, injection pressure begins to decay as fuel flows across the seat area. When the VDP pressure drops to an appropriate level, the nozzle check valve closes which ends fuel injection into the combustion chamber.

This invention is particularly useful in providing variations from the normal fuel injection cycle. For instance, it is well known in the art of diesel fuel injection that if, during the fuel injection cycle, a small amount of fuel can be injected prior to the main quantity of fuel (known as "split fuel injection" or simply as "split injection"), various engine performance benefits can be realized, such as lower combustion noise level, lower undesired engine emissions such as oxides of nitrogen ($NO_x$), and better engine thermal efficiency.

The significant advantage of the present invention is in enabling more flexibility, particularly with the ability to obtain split injection, in controlling engine performance and providing improvements in engine noise levels, lowering undesired engine emissions, and increasing fuel efficiency. Furthermore, operational reliability of the control valve is increased because there is no return spring to fail. Also, the present invention results in faster response times because there is no return spring force to overcome before poppet valve motion can be initiated as in conventional control valves.

Split injection can be achieved with the present invention utilizing different techniques for controlling the operation of the two electrical actuators or solenoid coils to control the position of the poppet valve with respect to the valve seat. That is, once the poppet valve has been moved to the valve closed position on the valve seat, injection pressure can then begin to build as the plunger continues downward and once the nozzle check valve pressure has been exceeded to open the nozzle check valve, fuel injection can take place. However, if immediately thereafter the electrical actuators are selectively operated to provide a lifting force to move the poppet valve off of the valve seat, this will tend to abruptly lower the injection pressure and eventually close the nozzle check valve to terminate fuel injection.

If now the electrical actuators are selectively operably energized to again move the poppet valve downward to the poppet valve closed position on the valve seat, the injection pressure will again begin to rise and a more nearly normal fuel injection can occur. Thus, as an example, a split injection cycle can be provided where about 5–10% of the fuel can be injected in the first portion of the injection cycle which could last for about 10° of crankshaft rotation, while about 90–95% of the fuel injection can occur in the injection cycle in the remainder of the cycle being about 30° crankshaft rotation.

Accordingly, a variety of operations of the two solenoid coils can be provided in order to enable the poppet valve to open from the valve seat for a short period during the injection cycle to create the desirable split injection conditions. Either sequential operation or concurrent operation, i.e., phasing, of the solenoid coils can be utilized. "Sequential operation" is herein defined to be selectively energizing a first solenoid coil, and then energizing a second solenoid coil but only after the usual solenoid operating lag time of the first coil has been completed. "Concurrent operation" or "phasing" is herein defined to be selectively energizing a first coil, and either energizing a second coil simultaneously, or during the usual solenoid operating lag time of the first coil.

For instance, where top and bottom solenoid coils are used with associated top and bottom permanent magnets, in a sequential operation the coils are selectively operatively energized to move the poppet valve from the upper top open valve position to the bottom closed valve position so that the injection pressure then begins to build. Reversing of the current in both solenoids in a sequential operation reverses the force on the poppet valve, tending to move the poppet valve upward, away from its closed valve position, and when the poppet valve begins to back away from the valve seat, injection pressure begins to decay as fuel flows across the seat area. This short rise and fall of the injection pressure can be made to exceed the nozzle check valve pressure so as to provide a small fuel injection to occur.

Reversing of the current to the solenoid coils in a sequential operation now moves the poppet valve in a downward projection towards the valve seat so as to close the valve seat and thereby enable the injection pressure to again build up. Current is then removed from the solenoids and the poppet valve remains latched in the closed valve seat position to again enable fuel injection to occur during this injection cycle. A split fuel injection cycle thereby is provided with a small fuel injection occurring followed by a larger fuel injection occurring over a longer time interval during the injection cycle.

Phasing, i.e. concurrent operation, of the electronic actuators can also be utilized to achieve split injection. For instance, in the aforementioned two solenoid coils and two permanent magnet embodiments of the invention, phasing of the operation of one solenoid coil with respect to the other can be utilized to provide the desired split injection and can also be utilized to provide other desirable characteristics. As an example, the top solenoid coil can be operably energized first with only a sufficient amount of energy to counter the latching force of the permanent magnet maintaining the poppet valve in the top valve open position. Thus the top solenoid can be energized first in order to set up a release of the poppet valve and prepare it for driving movement by the bottom solenoid coil. After a short interval following operable energizing of the top solenoid to ensure release of the poppet valve and before the top solenoid operating lag time has been completed, the bottom solenoid coil is operably energized with a larger current sufficient to move the poppet valve downwardly to the closed valve position on the valve seat. Current is removed from both solenoid coils as the lower permanent magnet holds the poppet valve in a sealed position against the valve seat.

This enables the injection pressure to begin to build and until the nozzle check valve is opened so that fuel injection is initiated.

Now the phasing is reversed so that current is initially supplied to the bottom solenoid coil in a direction to counter the magnetic field of the lower permanent magnet tending to release the poppet valve from the closed position. After a short time interval and before the bottom solenoid operating lag time has been completed, current is then supplied to the top solenoid coil in a direction tending to move the poppet valve upwardly until it backs off of the valve seat thereby causing the injection pressure to decay and ending this short term fuel injection. The current to the solenoids again is reversed using phasing, i.e. concurrent operation, so that the poppet valve is returned to the poppet valve closed position against the valve seat which again enables the injection pressure to build and enable the second fuel injection to occur during this fuel injection cycle.

As an alternative phasing technique, the current can be supplied first to the bottom solenoid (with the poppet valve in the top open valve position) so that the bottom coil is supplied with a sufficient energy to move the poppet valve. After a short time interval, within the bottom solenoid lag time, current is supplied to the top solenoid coil of sufficient energy to counter the latching magnetic field of the top permanent magnet. Thus, in this alternative phasing technique the bottom solenoid is supplied with a drive current and within the bottom solenoid lag time, the top solenoid is supplied with the release current; whereas in the previously described phasing configuration the top solenoid was initially supplied with a release current, and within the top solenoid lag time the bottom solenoid was supplied with the drive current.

In either event, energizing one solenoid before the lag time of the other solenoid has been completed reduces the total injection cycle by reducing the overall solenoid lag time, i.e. the delay time from the start of current to the time an adequate magnetic force level is achieved which aids in enabling a desired split injection capability.

Accordingly it can be seen that to attain split injection in control valves using generally slow acting solenoids, one must operate the valve twice in-a-row as fast as possible. However, a substantial and possibly the longest time element in operating a valve twice is the solenoid lag time on both opening and closing the valve. In a sequential operation the lag time of one coil must be added to the lag time of the other coil to obtain the total time required to complete the valve closing portion of the first injection; and the same adding of the lag times applies to opening the valve. In a concurrent operation, i.e. phasing, the solenoid lag times are occurring concurrently, so rather than adding the two lag times together, the cycle time is only some percent or portion of the total lag time in a sequential operation. Thus, phasing, or concurrently operating both solenoids versus sequentially operating the solenoids, provides a significant reduction in lag time which enables the valve to be actuated fast enough twice in-a-row to aid in achieving split injection with generally slow acting solenoids. Where faster acting electrical actuators are utilized in the control valve, split injection can be attained using sequential operation in accordance with the teachings herein.

In another alternative embodiment of the present invention, a control valve is provided with an upper solenoid and a lower solenoid each of which is adapted to respectively move the poppet valve from the upper open poppet valve position to the lower closed poppet valve position against the valve seat. In the upper open poppet valve position, residual magnetism maintains the poppet valve in this position. The upper solenoid coil is operably energized with a current level sufficient to create a magnetic field to overcome the residual magnetism, and with the lower solenoid coil operably energized this results in the poppet valve beginning to move downwards until the poppet valve contacts the valve seat. When the poppet valve contacts the valve seat, the operating energy to the lower solenoid coil is reduced to a holding current level sufficient to maintain the poppet valve in the closed poppet valve position.

With the valve seat closed, injection pressure then begins to build as the plunger continues downward and after the nozzle check valve opening pressure is exceeded fuel is injected. At the end of injection, the lower coil is deenergized and the upper coil is energized to move the poppet valve upwardly away from the valve seat. The upper coil is continued to be energized until the armature attached to the poppet valve contacts an upward pole piece which creates a zero air gap and a latching condition which holds the armature up against the pole piece.

While the above-described operation provides a normal injection cycle in this alternative embodiment using two solenoid coils, holding current and residual magnetism for latching, split injection can also be provided as previously described by selectively energizing the solenoids.

BEST MODE FOR CARRYING OUT THE INVENTION

Figure 1:
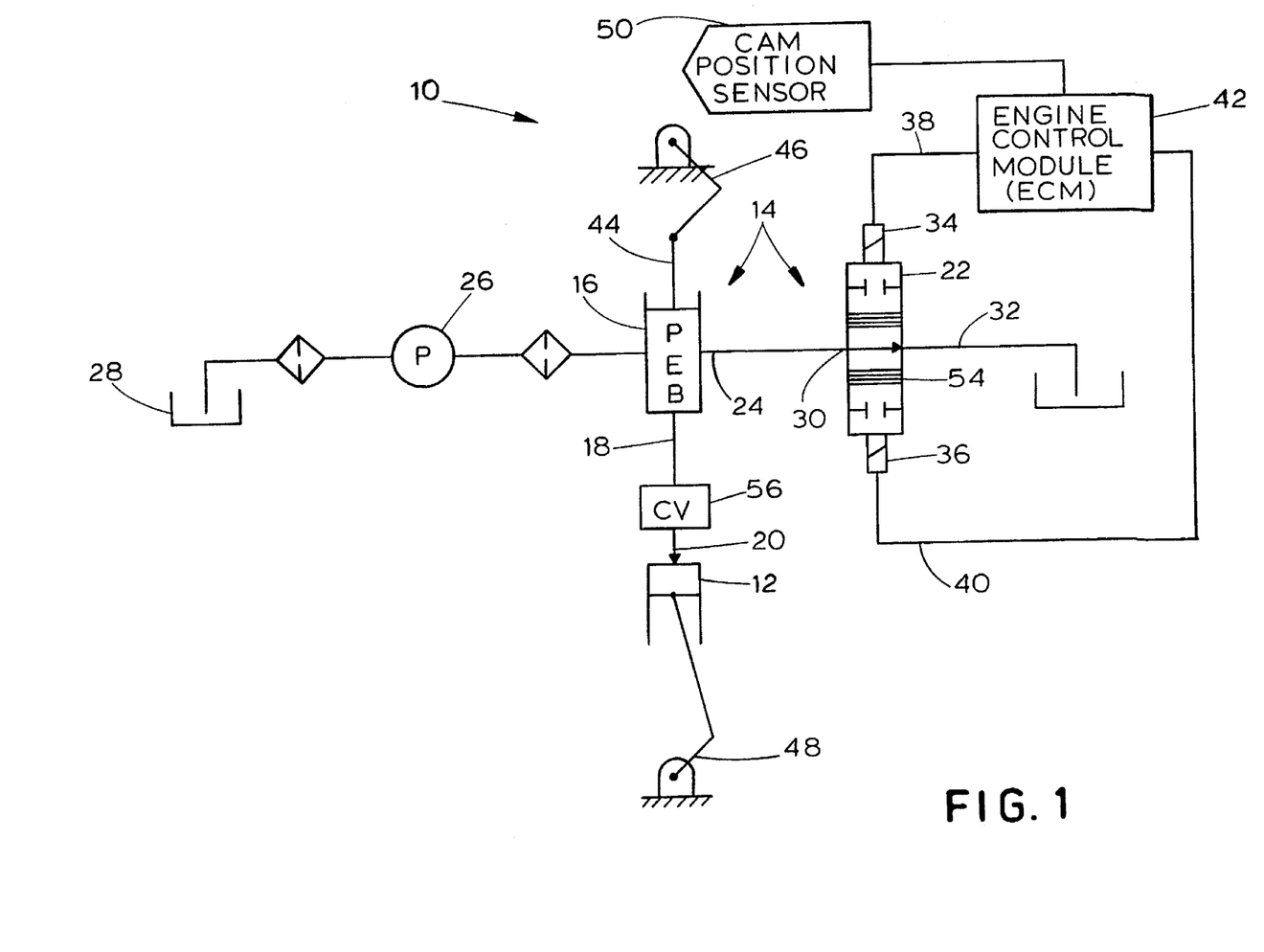
FIG. 1 is a schematic diagram illustrating a mechanically-actuated electronically-controlled injector fuel system incorporating the present invention.

In drawing FIGS. 1–10, the same reference numerals designate the same elements for features throughout all of the drawings. Referring now to FIG. 1, there is illustrated an injector fuel system 10. In the embodiments shown, the fuel system 10 is a mechanically-actuated electronically-controlled unit injector fuel system, hereinafter referred to as a MEUI fuel injection system. The exemplary MEUI fuel injection system 10 as shown in FIG. 1 is adapted for the diesel-cycle direct-injection internal combustion engine having a number of engine pistons, only one of which, i.e. engine piston 12 is shown in FIG. 1 for convenience. Each engine piston and corresponding engine cylinder would have a mechanically-actuated electronically-controlled unit injector 14 which includes a fuel pumping assembly 16 supplying fuel to a nozzle assembly 18 leading to a tip 20, and a control valve assembly 22 for electronically controlling fuel injection delivery in the MEUI fuel system 10.

Figures 2, 4:
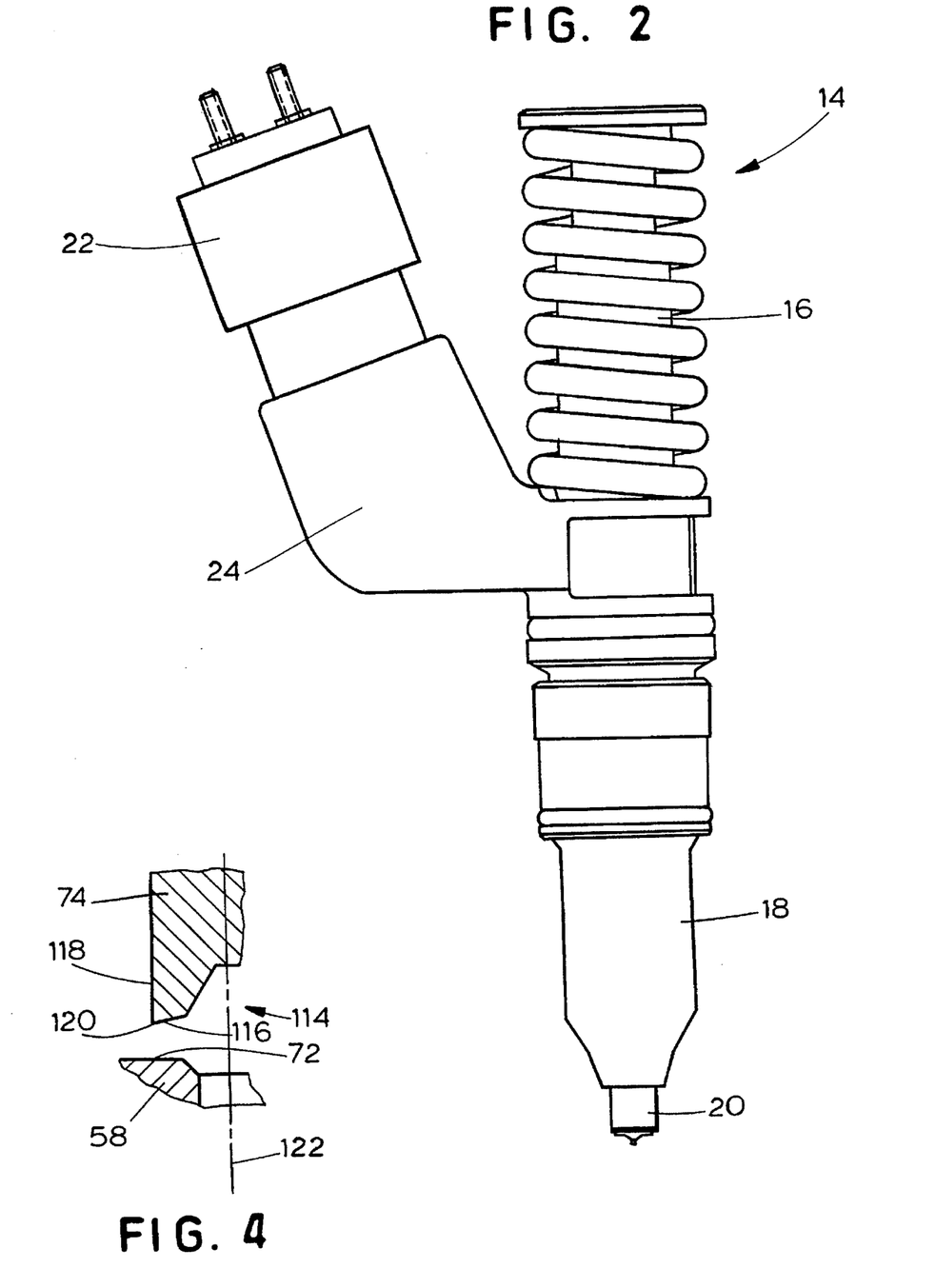
FIG. 2 is an elevational view of a unit fuel injector incorporating a pressure control valve assembly in accordance with the present invention.
FIG. 4 is a fragmented sectional view of a poppet valve illustrating a flat seat and a concave end with knife edge valve member.

The schematic view of the fuel injector 14 shown in FIG. 1 can be correlated to the same components as shown in the elevational view of FIG. 2. An injector body 24 interconnects the control valve assembly 22 with the fuel pumping assembly 16 for enabling fuel pressure to be developed or alternatively, to controllably spill the fuel back to the fuel tank to prevent the development of fuel pressure within the injector 14. The injector body 24 incorporates one or more appreciable fuel passageways between the control valve assembly 22 and the fuel pumping assembly 16.

Figure 3:
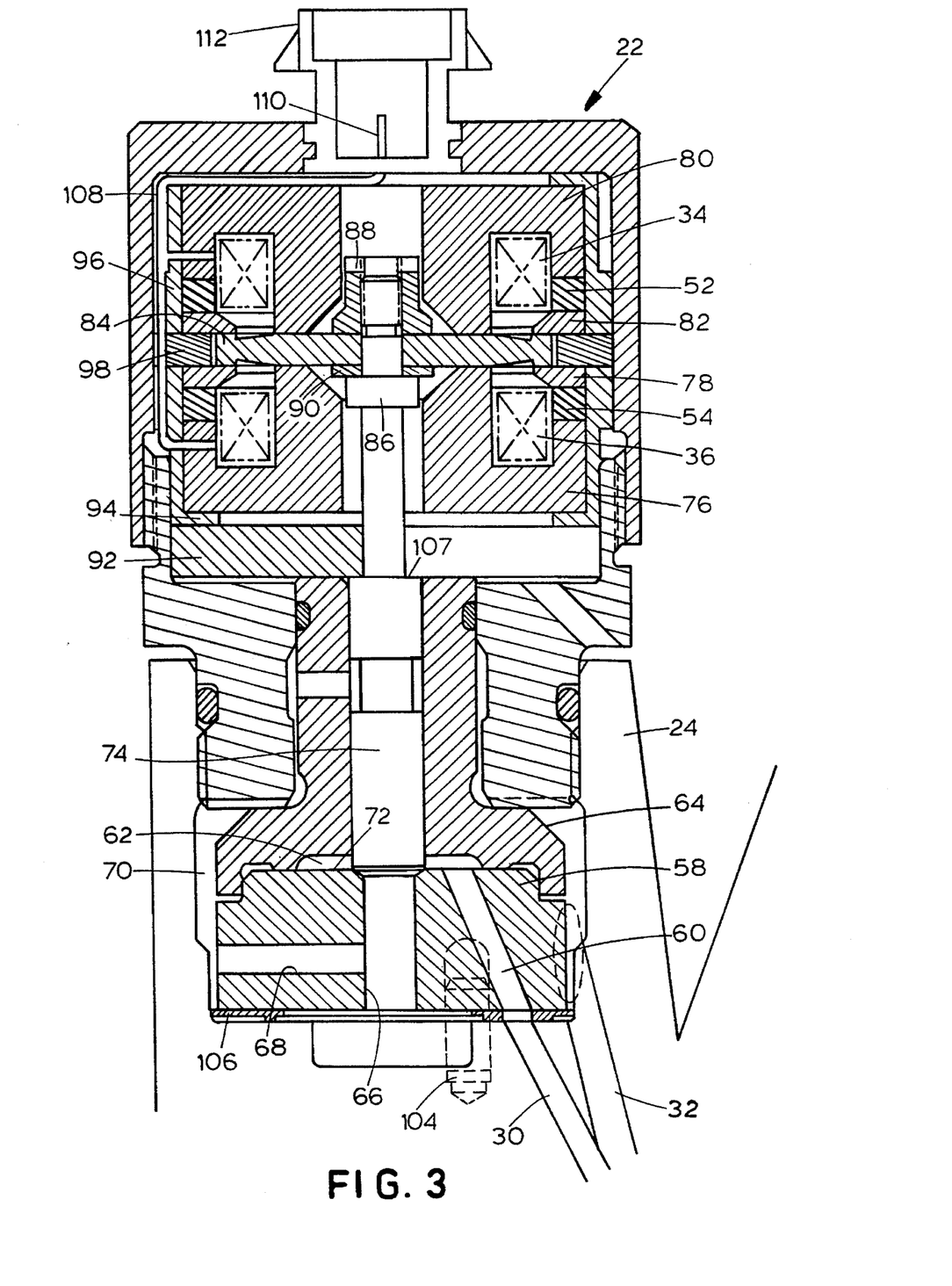
FIG. 3 is an elevational view, partly in section, of a control valve assembly according to the present invention.

Referring now to FIG. 1, a low pressure transfer pump 26 supplies fuel from a fuel source or tank 28 to the fuel injector pumping assembly 16 and via suitable passageways in injector body 24 the fuel is coupled to the control valve assembly 22. One or more fuel line filters may be provided. Referring to FIGS. 1 and 3, electromagnetically operable control valve assembly 22 has an inlet 30 for receiving the fuel and an outlet 32 which drains the fuel to a fuel gallery in the engine cylinder head for eventual return to the fuel source 28. Control valve assembly 22 includes a pair of first and second electromagnetic devices or actuators, such as solenoids 34, 36, for receiving electrical control signals on respective input lines 38, 40 from an engine control module 42.

Within pumping assembly 16, there is mounted a plunger 44 actuated by an engine driven cam 46. Cam 46 is in turn mounted on an engine crank 48 and the cam position is sensed by a cam position sensor 50 and coupled to the engine control module 42. Thus, the position of piston 12 as determined by the engine crank 48 is synchronized with the position of the plunger 44 as actuated by the crank driven cam 46, as well as variably synchronized with actuation of the solenoids 34, 36 from the control signals on respective lines 38, 40 via the engine control module 42.

The control valve assembly 22 also includes a pair of permanent magnets 52, 54. The permanent magnets 52, 54 are provided to maintain the control valve assembly 22 in either a desired valve open or valve closed position. Changing from the valve open to the valve closed position, or vice versa, is provided by suitably operably energizing the solenoids 34, 36 via the engine control module 42.

As can be seen from FIG. 1, with the control valve assembly 22 in the illustrated valve open position, fuel under low pressure is pumped through the control valve assembly and outlet 32 back to the fuel gallery in the engine cylinder head. As piston 12 moves in the engine cylinder, and with corresponding movement of the plunger 44 in the pumping assembly 16, a position is reached where it is desired to deliver fuel to the engine, and the engine control module 42 provides suitable control signals on lines 38, 40 to close the control valve assembly 22. This effectively blocks fuel at the fuel inlet 30 of the control valve assembly 22 and permits the fuel in the pumping assembly 16 to be pressurized. Eventually, with increasing cam actuation, pressure is reached which will actuate a nozzle check valve 56 in the nozzle assembly 18 to permit the fuel to flow through the tip 20 and to be injected into the engine combustion chamber defined by the piston 12 and engine cylinder. Upon the delivery of a sufficient amount of fuel, the engine control module 42 signals the control valve assembly 22 to open the control valve assembly thereby reconnecting valve input line 30 to the valve output line 32, spilling the fuel and depressurizing the pumping assembly 16.

Accordingly, it can be seen that the opening and closing of the control valve assembly 22 controls the pressurization of the pumping assembly 16 and thereby controls the timing and quantity of fuel delivered to the engine. It is therefore important that the operation of the control valve assembly 22 should be as rapid as possible during the opening and closing operations.

Referring to FIG. 3, there is illustrated the preferred embodiment of a control valve assembly 22 which can provide the rapid on/off action with a minimum of component parts and in a reliable manner so as to be desirable for use in the MEUI fuel injection system 10 of FIG. 1. Injector body 24 includes passageways adapted to accommodate fuel inlet 30 and fuel outlet 32. A valve seat 58 includes an angled passageway 60 communicating the fuel inlet 30 to a fuel chamber 62 located above the valve seat 58 and below a guide barrel 64. The fuel chamber 62 is defined by a corresponding cavity at the bottom end of the guide barrel 64 and the opposite flat surface of the valve seat 58. The valve seat 58 further includes a central aperture 66 which communicates the fuel chamber 62 with a transverse passageway 68 (with the valve open) which in turn communicates with an annular cavity 70 in the injector body 24 leading to the fuel outlet 32. The valve seat 58 includes a flat seating surface 72 which sealingly mates with a movable valve member or poppet valve 74. The bottom end of the poppet valve 74 is formed as shown in FIG. 4 so as to seal on the flat or planar seating surface 72 of the valve seat 58. The poppet valve 74 is slidably mounted and guided within the inner diameter of the guide barrel 64.

The solenoid coils 34, 36 are provided concentrically mounted with respect to the poppet valve 74 for slidably moving the poppet valve in the upward and downward direction of FIG. 3 and within the guide barrel 64. The solenoid coil 34 is mounted within a lower inner pole 76 which in turn cooperates with a lower outer pole 78. The permanent magnet 54 is mounted between the lower inner pole 76 and the lower outer pole 78. In a similar manner, the upper solenoid coil 34 is mounted within an upper inner pole 80 which in turn cooperates with an upper outer pole 82. The permanent magnet 52 is mounted between the upper inner pole 80 and the upper outer pole 82.

At the opposite poppet valve end from the valve seat 58, there is provided an armature 84 mounted on a poppet valve shoulder portion 86 and maintained securely attached to the poppet valve threaded end portion by means of a threaded nut 88. The armature 84 is mounted between the respective upper and lower pole pieces with respective small air gaps on each armature side. A shim 90 can be provided between the armature and the shoulder 86 so as to adjust the position of the armature between the respective pole pieces.

The stop member 92 is securely held in position at its bottom end adjacent the guide barrel 64 and at its upper end by means of a lower pole retainer 94 and an upper pole retainer 96 which are respectively separated by means of a spacer member 98. A cap 100 is threadably mounted or otherwise securely fastened to a housing 102 for securely maintaining the control valve assembly components locked in position. Suitable O-rings can be provided for maintaining the unit dust free and environmentally secure from undesired fluids. A locating dowel 104 assists in proper insertable mounting of the control valve assembly 22 within the injector body 24. A high pressure seal 106 is located between the control valve assembly 22 and the injector body 24 to fluidly seal the connection between the fuel inlet 30 and the angled passageway 60 in the valve seat 58.

In the control valve assembly 22 shown in FIG. 3, the poppet valve 74 can be slidably moved to its topmost position until a shoulder 107 formed between changing poppet valve inner diameters engages the stop 92. Stop 92 can be formed as a C-clip. In this topmost position of the poppet valve 74, the bottom of the poppet valve has moved away from the flat seating surface 72 on the valve seat so that there is communication between the angled passageway 60, through the fuel chamber 62 to the central aperture 66. Also, in this topmost position of the poppet valve 74, there is a slight air gap between the top surface of the armature 84 and the upper pole pieces 80, 82.

In the lowermost position of the poppet valve 74, the bottom of the poppet valve is seated against the flat surface 72 of the valve seat 58 so that the angled passageway 60 and the fuel chamber 62 are blocked off from the central aperture 66. Also, in this lowermost position of the poppet valve 74, there is a slight air gap between the bottom surface of the armature 84 and the respective surfaces of lower poles 76, 78.

Two wires from the solenoid 34 and two wires from the solenoid 36 are coupled through a four-wire cable 108 to suitable connecting pins 110 in a four-wire molded connector 112 which can be snap mounted into the top of the cap 100.

FIG. 4 illustrates the details of a preferred seating configuration for the control valve assembly. The poppet valve member 74 includes a concave end 114 wherein end surface 116 is formed at a small actuated angle (for example, about 95° relative to the poppet exterior surface 118) thereby providing an annular circular knife edge 120 at the intersection between the end surface 116 and the exterior surface 118. It is understood, of course, that the valve seat 58 and the poppet valve member 74 are respectively symmetrically shaped with respect to centerline 122. It is to be understood, that while conventional angled surfaces between the poppet valve member and the valve seat can be provided rather than the illustrated flat seating surface 72 and concave end 114 with annular knife edge 120, the illustrated seating configuration of FIG. 4 is preferred.

In the control valve assembly 22 of FIG. 3, the permanent magnets 52, 54 form suitable magnetic forces to latch the poppet valve 74 in the respective topmost position against the stop member 92 to open the valve seat 58 or to latch the poppet valve in the lowermost position in sealing engagement with the flat seating surface 72 so as to close the valve seat. The solenoid coils 34, 36 are operably energized to form suitable magnetic fields to respectively release the poppet valve from one of the latched positions and to move the poppet valve to the other position so as to open and close the valve.

Figure 5:
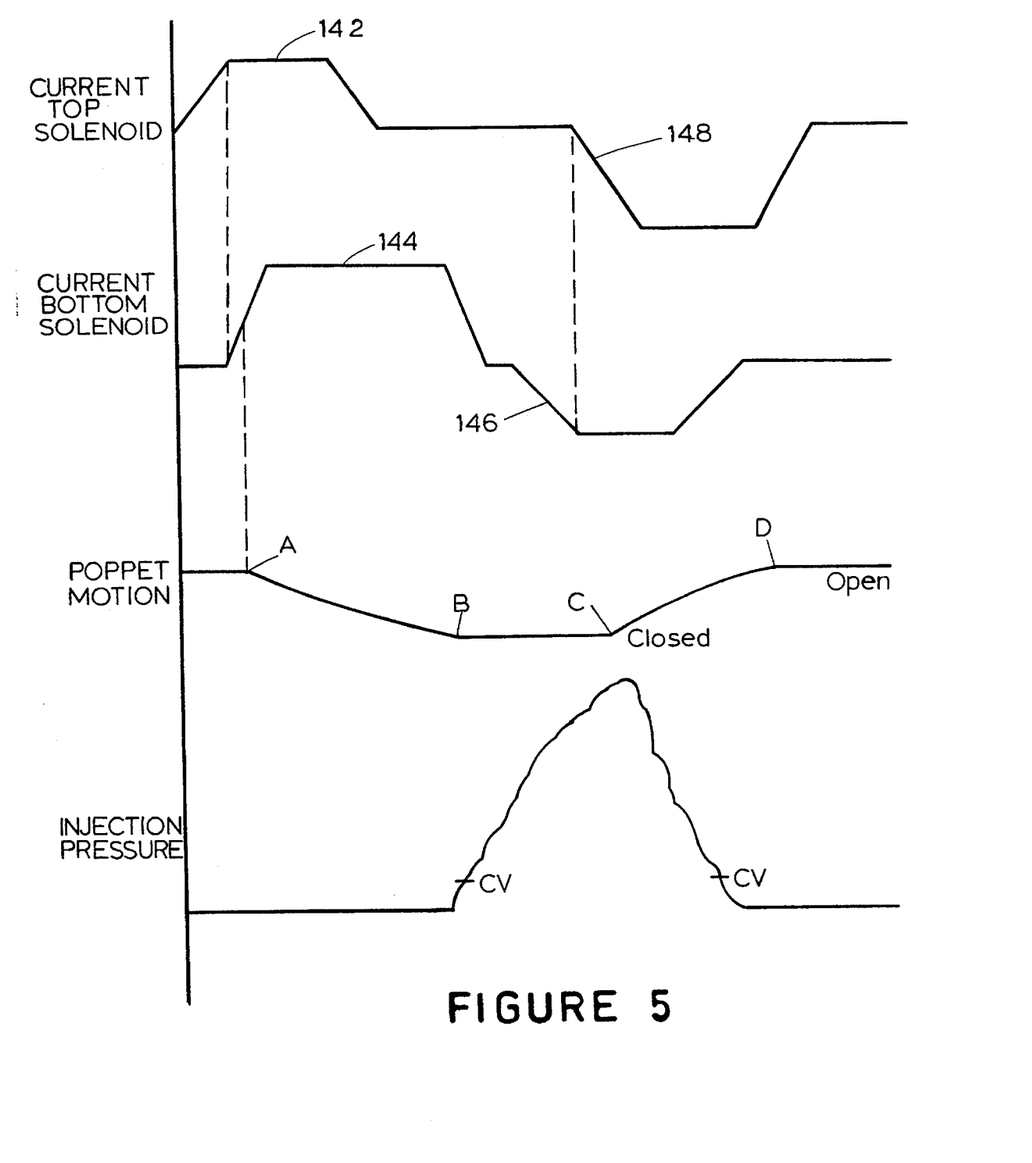
FIG. 5 is a timing diagram illustrating solenoid operating waveforms, poppet position, and a normal fuel injection cycle.
Figure 6:
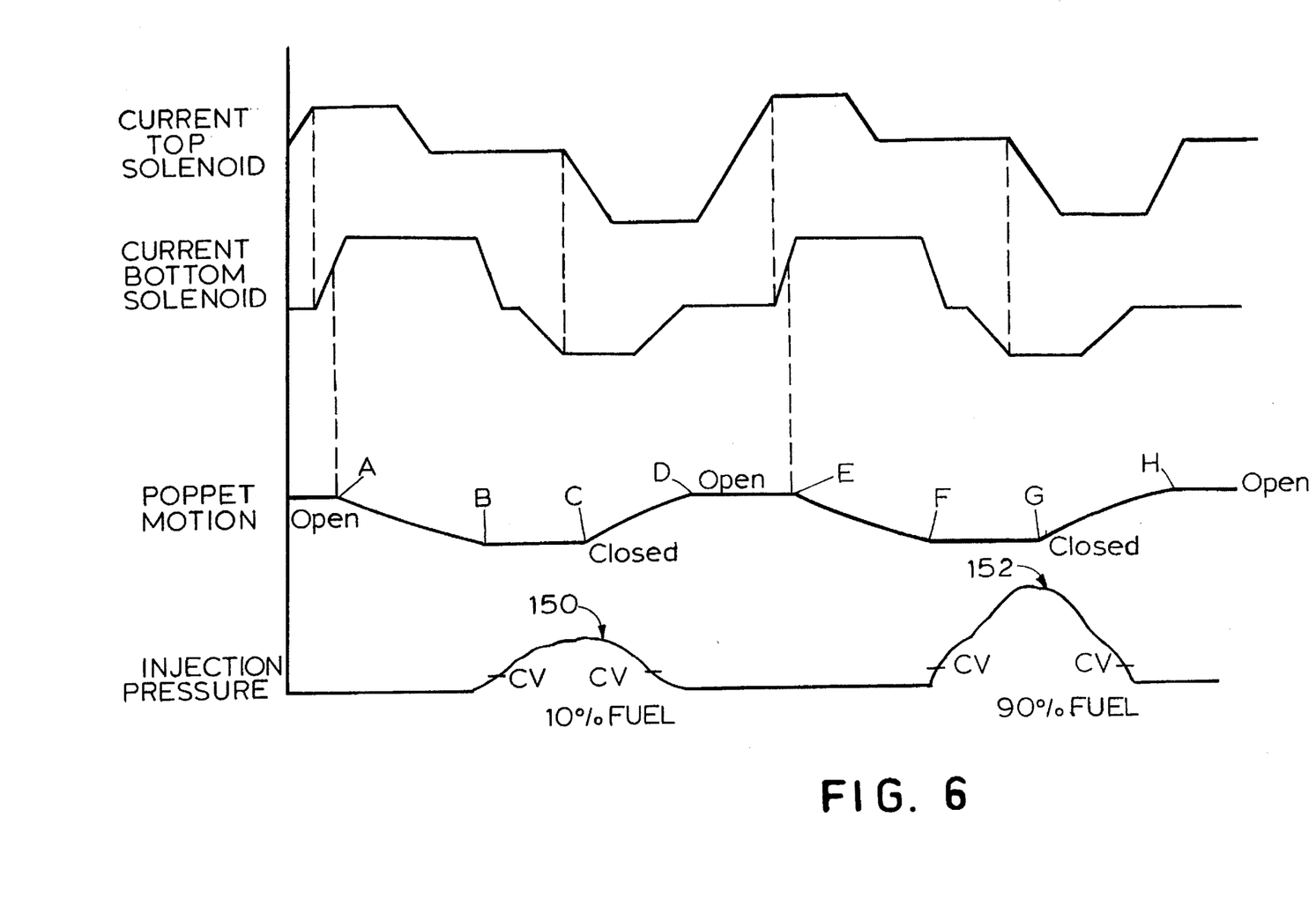
FIG. 6 is a timing diagram similar to that of FIG. 5 illustrating a split fuel injection cycle with sequential operation of solenoids in accordance with another aspect of this invention.
Figure 7:
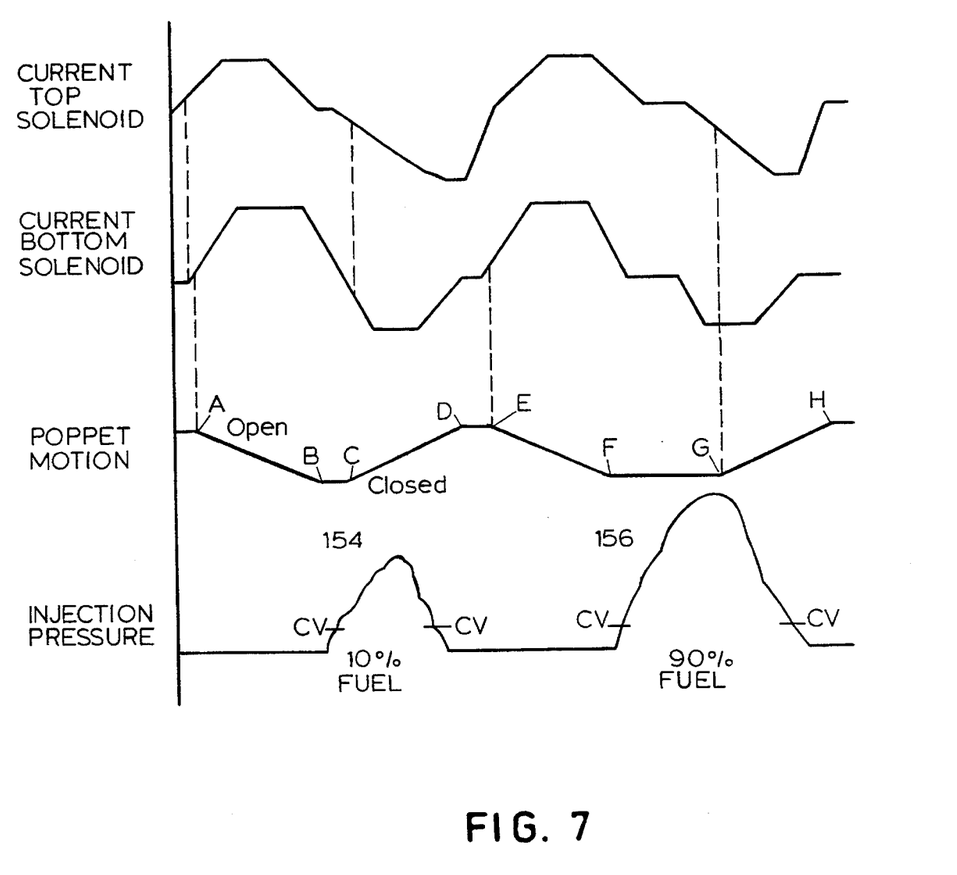
FIG. 7 is a timing diagram similar to that of FIGS. 5 and 6 and illustrating an alternative technique for achieving a split injection cycle with concurrent operation of solenoids in accordance with the invention.

The timing diagrams shown in FIGS. 5–7 illustrate the selective operative electrical energizing of the solenoids 34, 36 with the resulting change in the poppet position so as to create a fuel injection cycle. For convenience of illustration and description, ideal waveforms are shown in FIGS. 5–7. It is understood that in practice the actual waveforms would be rounded at the transition points rather than the illustrated abrupt direction changes.

FIG. 5 illustrates an example of ideal waveforms for a normal fuel injection cycle; FIG. 6 illustrates the ideal waveforms for providing a desirable split fuel injection cycle using sequential operation of the solenoids; and FIG. 7 illustrates the ideal waveforms to provide a split fuel injection cycle using concurrent operation of the solenoids. The operation of the control valve assembly 22 in the injector fuel system 10 of FIG. 1 to obtain a normal fuel injection or a desired split injection will be described hereinafter.

The control valve assembly 22 affords significant advantages in that both the opening and closing of the valve can be electronically controlled. This provides greater flexibility in controlling engine performance and providing improvements in engine noise levels, lowering undesired engine emissions, and increasing fuel efficiency.

Figure 8:
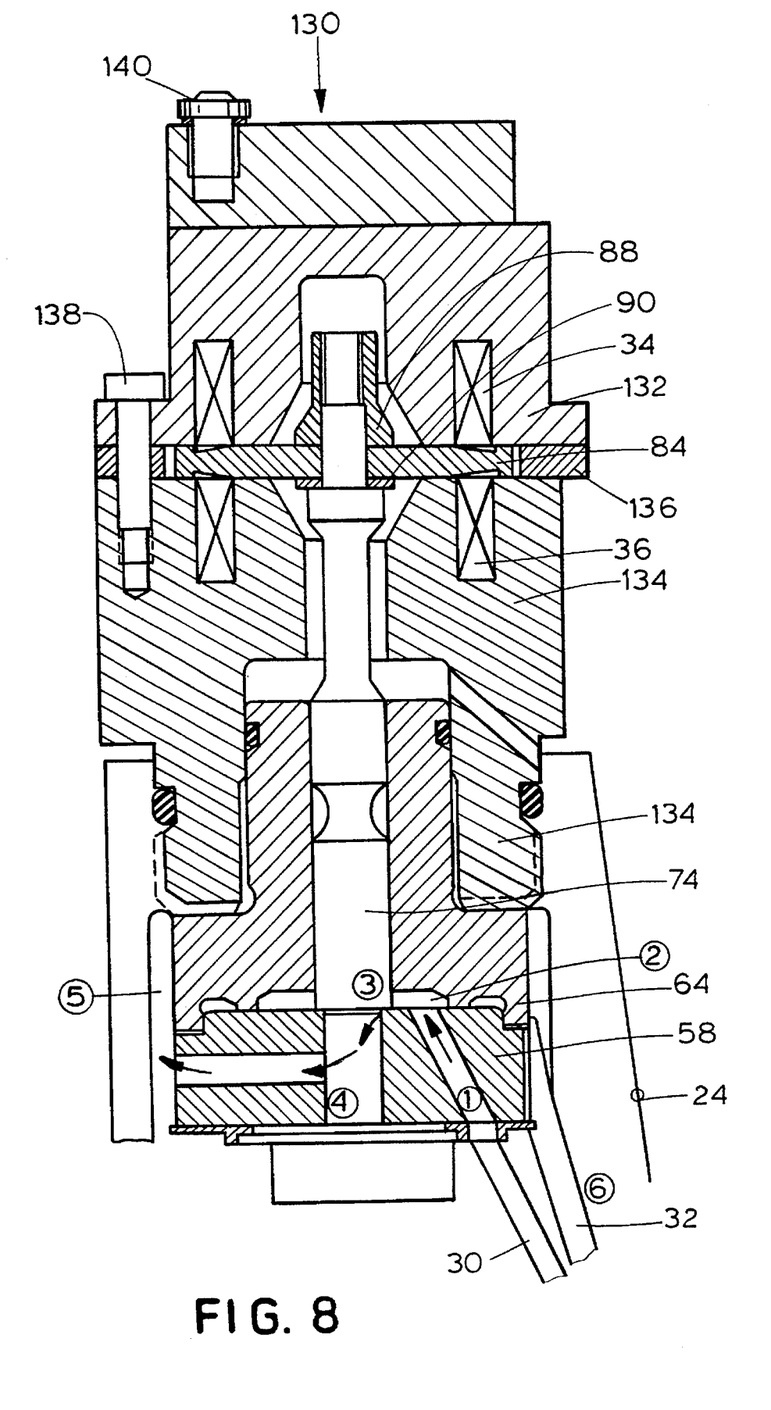
FIG. 8 is an elevational view, partly in section, of an alternative control valve assembly according to the present invention.

Turning now to FIG. 8, there is illustrated an alternative embodiment of a unit injector incorporating two solenoid coils for selectively moving the poppet valve, holding current to maintain the valve in the closed position, and latching of the poppet valve in the open position using residual magnetism.

A control valve assembly 130 is threadably mounted into the injector body 24 in the same manner as the control valve assembly 22 of the previous embodiment shown in FIG. 3. In addition, the control valve assembly 130 includes many of the same components as in the prior illustrated control valve assembly 22, namely the valve seat 58, guide barrel 64, and the poppet valve 74 with attached armature 84. The upper solenoid 34 is mounted within and cooperates with an upper pole piece 132 above the armature, and the lower solenoid coil 36 is mounted within and cooperates with a lower pole piece 134. A spacer member 136 is inserted between the pole pieces 132, 134 and is sized to permit an air gap to exist between the armature 84 and the lower pole piece 134 with the poppet valve 74 in the closed position against the valve seat 58, and so that there is no air gap between the armature 84 and the upper pole piece 132 with the poppet valve in the top or open valve position with the armature 84 contacting the upper pole piece 132 without an air gap.

A series of bolts 138 maintains the components in position. A four-wire connector 140 is provided for receiving the respective two wires from each of the solenoids 34, 36 and interconnecting the four wires to a corresponding set of terminals within the connector.

In the control valve assembly 130 of FIG. 8, holding current supplied to the lower solenoid coil 36 maintains the poppet valve 74 in a closed valve sealed condition against the flat seating surface 72 of the valve seat 58. Selectively operating the upper and lower solenoid coils 34, 36 enables the poppet valve to be moved from the closed valve condition upwardly to an open valve condition where the armature 84 contacts the upper pole piece 132.

The magnetic circuit that provides the latching force between the armature 84 and the upper pole piece 132 must be designed with the following considerations in mind. The proper latching force must be obtained and the materials chosen for the armature 84 and the upper pole piece 132 must be able to withstand hundreds of millions of cycles of impact between these two members. The required latching force and impact resistance can be achieved by the selection of common steels with the proper heat treatment that provides the appropriate residual magnetic properties and appropriate impact resistance.

The upper pole piece 132 and the armature 84 are preferably formed of steel having a carbon content between about 0.8% and 1.2% and having a Rockwell C ("RC") hardness between about 40 and 60 so that the armature 84 may be latched by residual magnetism against the pole piece 132 and so that the armature 84 will not exhibit significant physical wear despite repeated actuation.

One example of a suitable steel is SAE (Society of Automotive Engineers) 52100 steel having an RC hardness of about 59. SAE 52100, which is a conventional steel used for bearing applications, is steel having the following constituents, by weight percent, expressed either as a range of permissible percentages or a maximum allowable percentage:

| | |
|---|---|
| Carbon | 0.98–1.10% |
| Manganese | 0.25–0.45% |
| Phosphorous$_{max}$ | 0.025% |
| Sulfur$_{max}$ | 0.025% |
| Silicon | 0.15–0.30% |
| Chromium | 1.30–1.60% |

SAE 52100 steel may also have trace amounts of the following constituents:

| | |
|---|---|
| Copper$_{max}$ | 0.35% |
| Nickel$_{max}$ | 0.25% |
| Molybdenum$_{max}$ | 0.08% |

As described in more detail below, a suitable RC hardness may be achieved by heat treating the upper pole piece 132 and the armature 84.

The valve assembly components formed of the preferred steel, which include the upper pole piece 132 and the armature 84, may be subject to a hardening process, such as heat treating, to achieve a desired, precise latching force. There is a relationship between the hardness of the preferred steel and the magnetic characteristics of the steel. As the hardness of the preferred steel generally increases, the magnetic characteristics change so that the amount of residual magnetism which can be induced in the steel increases. As a result, the latching force also increases.

Figure 9:
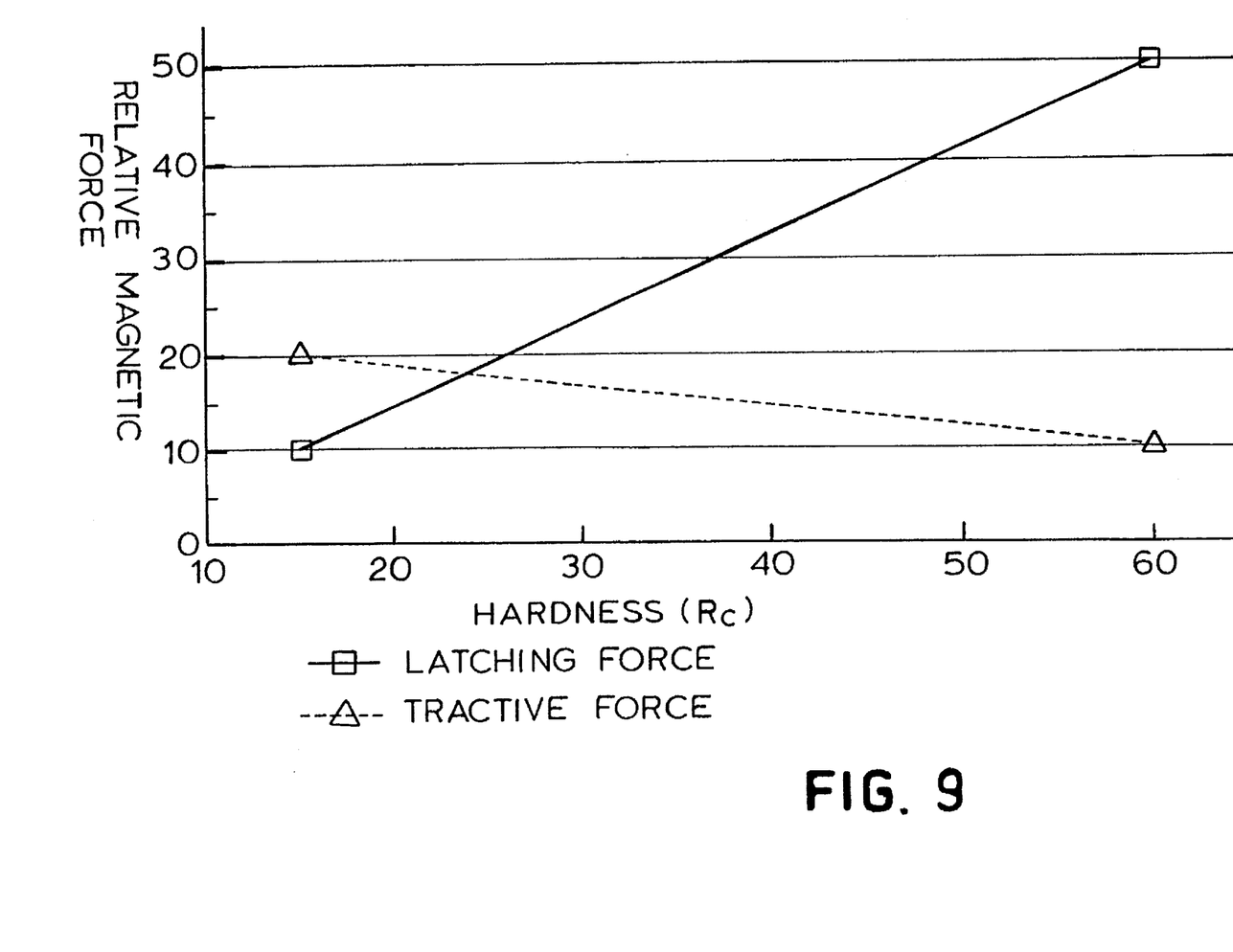
FIG. 9 is a graph of magnetic force vs. hardness.

FIG. 9 illustrates the general relationship between the RC hardness of SAE 52100 steel and the resultant latching and tractive forces, expressed as a relative percentage of magnetic force. It can be seen that the relative latching force (represented by the solid line) increases as the RC hardness of the steel increases. Although the relationship between RC hardness and latching force is generally illustrated in FIG. 9 to be linear, the graph in FIG. 9 is an approximation, and the relationship is not necessarily linear. The precise relationship between hardness and latching force for SAE 52100, as well as for other preferred steels, can be empirically determined by preparing a number of samples of a preferred steel having incrementally different hardnesses and measuring the resultant latching force for each steel sample. The measured latching force for each steel sample can be graphically plotted as in FIG. 9.

FIG. 9 also illustrates the general relationship between the tractive force (represented by the dotted line) and the RC hardness of the SAE 52100 steel. The tractive force is the attractive force exerted upon the armature 84 due to energization of one of the coils 34, 36. The precise relationship between the hardness and the relative tractive force can also be empirically determined for the preferred steels in a manner similar to that described above.

The desired steel components of the control valve assembly 130 may be manufactured in accordance with the following method. First, the desired latching force for the armature 84 is determined in a conventional manner based upon typical factors such as the area of the armature 84 that will be in contact with the upper pole piece 132 and the number of ampturns of the solenoid coils 34, 36 used in the control valve assembly 130.

After the desired latching force is determined, that latching force is obtained by determining what the corresponding hardness of the control valve assembly components, i.e., the armature and pole member(s) should be, based on the known relationship between the hardness and the latching force, and heat treating the components to obtain that hardness.

For example, using the graph of the latching force illustrated in FIG. 9, if the desired latching force corresponds to a relative magnetic force of 45%, it can be seen that the corresponding RC hardness would be approximately 54. Therefore, to achieve the desired latching force, the armature and pole member(s) would be heat treated to achieve a final RC hardness of 54.

In the method of manufacturing, the desired control valve assembly components are first formed out of steel using any conventional method, such as by machining them, and then they are subjected to a heat treating process to achieve the desired hardness, and as a result, to achieve the desired latching force.

In the heat treating process, the components are initially hardened by raising their temperatures to a first relatively high temperature, such as about 843° C. (1550° F.), and then by cooling them in an agitated bath, such as an oil bath. As a result of this hardening step, the initial hardness of the steel components will be a relatively high value, such as an RC hardness of about 65.

After the hardening step, the components are subject to a tempering step. In this step, the temperature of the components is raised to a second temperature, such as about 204° C. (400° F.), lower than the first relatively high temperature employed in the initial hardening step. As is well known, the temperature to which the components are raised in the tempering step depends on the final hardness to be achieved. The components are then cooled, such as by air cooling them. As a result of the tempering step, the hardness of the armature and pole member(s) will be reduced to a lower value, such as an RC hardness of about 59.

In the heat treating steps described above (and as is conventional practice), a relatively large number of components are simultaneously heated and cooled together to maximize the energy efficiency of the process.

The control valve assembly 130 also enables electronically controlling both the opening and closing of the valve. Therefore as in the case with the control valve assembly 22, the control valve 130 also provides significant advantages in affording greater flexibility in controlling engine performance and improvements in engine noise levels, undesired emissions, and fuel efficiency. Furthermore, either a normal fuel injection cycle or a split fuel injection cycle can be provided with the control valve assembly 130. The timing diagram shown in FIG. 10 to achieve normal fuel injection, and the operation to achieve split fuel injection utilizing the control assembly 130 will be described hereinafter.

Industrial Applicability

The operation of the control valve 22 with two solenoid coils and two permanent magnets operating as the electrically-actuated pressure control device for the fuel injector 14 shown in the injector fuel system 10 of FIG. 1 will now be described. Initially, the operation of the control valve assembly 22 to provide a normal fuel injection cycle as shown in FIG. 5 will be described, followed by a description of the operation to achieve split fuel injection during the fuel injection cycle as shown in FIGS. 6 and 7.

With reference to FIGS. 1–5, as the plunger 44 in the fuel injector pumping assembly 16 begins to move down, fuel is forced from the plunger pumping chamber through a passage in the injector body 24 into valve input line 30, through the angled passageway 60 and into the annular area in the fuel chamber 62 below the guide barrel 64. Since fuel injection is not ready to begin as yet, the poppet valve 74 is in the unseated or up position and maintained in that position by the magnetic force exerted on the armature 84 by the permanent magnet 52. The flux created by the permanent magnet 52 flows down through the upper outer pole 82, through the air gap to the armature 84, up through the air gap to the upper inner pole 80 and back around to the permanent magnet 52.

With the poppet valve 74 maintained in the up position, the fuel can flow by the flat seating surface 72, under the concave end 114 of the poppet, through the central aperture 66, the transverse passageway 68 and into the annular cavity 70 in the injector body. The fuel flows around the annular cavity 70 until it reaches the valve outlet leading to valve outlet line 32 where the fuel then flows back to a connection to the fuel gallery in the cylinder head of the engine. It is understood, of course, that during this time, the poppet valve is maintained in the unseated position against the stop 92 by means of the permanent magnet 52.

FIG. 5 illustrates a normal fuel injection cycle using sequential operation. When it is time to start building pressure for fuel injection, an operating voltage is applied to the upper solenoid coil 34 to provide a current 142. The rising current 142 creates a magnetic field which tends to cancel the magnetic field created by the permanent magnet 52. After the top solenoid lag time, an operating voltage is applied to coil 36 so that a much larger rising current 144 flows through the lower solenoid coil 36. This current creates a magnetic field which tends to pull the armature 84 downwards. The direction of the magnetic field from the coil 36 is the same as the direction of the magnetic field created by the lower permanent magnet 54 and after a short time the poppet will begin to move downwards, as indicated at reference A shown in FIG. 5. Operation of the top solenoid is stopped while the operation of the bottom solenoid coil is maintained until the poppet concave end 114 contacts the flat seating surface 72 in the closed valve position on the valve seat 58 as indicated at reference position B. When the poppet valve 74 contacts the valve seat, the current to the lower coil is stopped and begins to decay towards a zero level. The lower permanent magnet 54 now holds the poppet valve 74 against the valve seat 58.

When the poppet valve contacts the valve seat as indicated at reference position B, the fuel chamber 62 is sealed off from the central aperture 66 and no more fuel can pass by the seat. This starts the fuel injection cycle wherein the injection pressure then begins to build as the plunger 16 continues downwards. When the appropriate injection pressure has been reached so as to exceed the nozzle check valve pressure indicated as CV in the lower most waveform of FIG. 5, the nozzle check valve 56 opens and fuel is injected from the tip 20 into the engine combustion chamber.

To stop fuel injection, a current 146 is applied to the lower solenoid coil 36 to create a magnetic field which cancels the magnetic field created by the lower permanent magnet 54. After the bottom solenoid lag time, a much larger current 148 is applied to the upper solenoid coil 34. This creates a magnetic field which enhances the field created by the upper permanent magnet 52 and tends to move the armature 84 upwards, and after a short time the poppet will begin to move upwards away from the valve closed position on the valve seat 58 as shown at reference position C.

Once the seat area is opened slightly, fluid flow across the concave end 114 creates an upwards force which dramatically improves the poppet opening response time. The current 146 is stopped to the bottom solenoid coil 36 and the current 148 to the upper solenoid coil 34 is maintained until the poppet valve 74 contacts the stop 92 as shown at the valve open position at reference position D. The current 148 to the solenoid coil 34 is stopped and the upper permanent magnet 54 now holds the poppet against the stop. As can be seen from the lower most waveform of FIG. 5, when the poppet moves away from the valve seat 58 at reference position C, the valve begins to open and the injection pressure begins to decay as fuel flows across the seat area. When the injection pressure drops to an appropriate level indicated as CV, the nozzle check valve 56 closes which ends fuel injection to the engine combustion chamber.

As indicated in FIG. 5, during this fuel injection cycle, one large burst of fuel injection is supplied coinciding with the injection pressure exceeding the nozzle check valve pressure CV.

FIG. 6 shows a split injection cycle using sequential operation. Referring now to FIG. 6, there is illustrated the application of suitable operating voltages in a sequential operation to the top and bottom solenoids 34, 36 utilizing the control valve assembly 22 of FIG. 3 to move the poppet valve 74 to the reference positions A through H which provides a split or two-part fuel injection during the injection cycle, consisting of a first smaller fuel injection 150 followed by a larger fuel injection 152. As can be seen from FIG. 6, the smaller fuel injection portion 150 starts with the valve closed position at poppet reference position B. While the injection pressure is continuing to build, the bottom solenoid and top solenoid are operably energized to counteract the downwards pull of magnet 54 so that at poppet reference position C the poppet valve comes up away from the valve seat 58 thereby causing an abrupt decay in the injection pressure which pressure ends as the valve open position is reached at poppet reference position D.

Thereafter, the solenoids are again operably energized as shown in the right-hand portion of FIG. 6 to move the poppet valve through reference positions E through H. At reference position F the injection pressure can start to build once again to provide the larger fuel injection portion 152. The smaller injection portion 150 is accomplished over about 10° of crank rotation, whereas the larger injection portion 152 is provided over about 30° of crankshaft rotation. Also, over the entire split injection cycle, the smaller fuel injection portion 150 supplies about 5–10% whereas the larger fuel injection portion 152 supplies about 90–95% of the fuel injection. These amounts can of course be suitably adjusted as desired through selective operation of the solenoids in accordance with the teachings herein.

FIG. 7 illustrates the waveforms applied to the upper and lower solenoids of the embodiment of FIG. 3 in a phasing, i.e., concurrent operation to provide a split injection cycle wherein the poppet valve is moved to the reference positions A through H. Notice that the bottom solenoid, for instance, is energized during the lag time of the top solenoid, and this phasing occurs in other instances as well to reduce the overall required solenoid lag time. This provides split injection portions consisting of a smaller first fuel injection portion 154 followed by a much larger second fuel injection portion 156.

Figure 10:
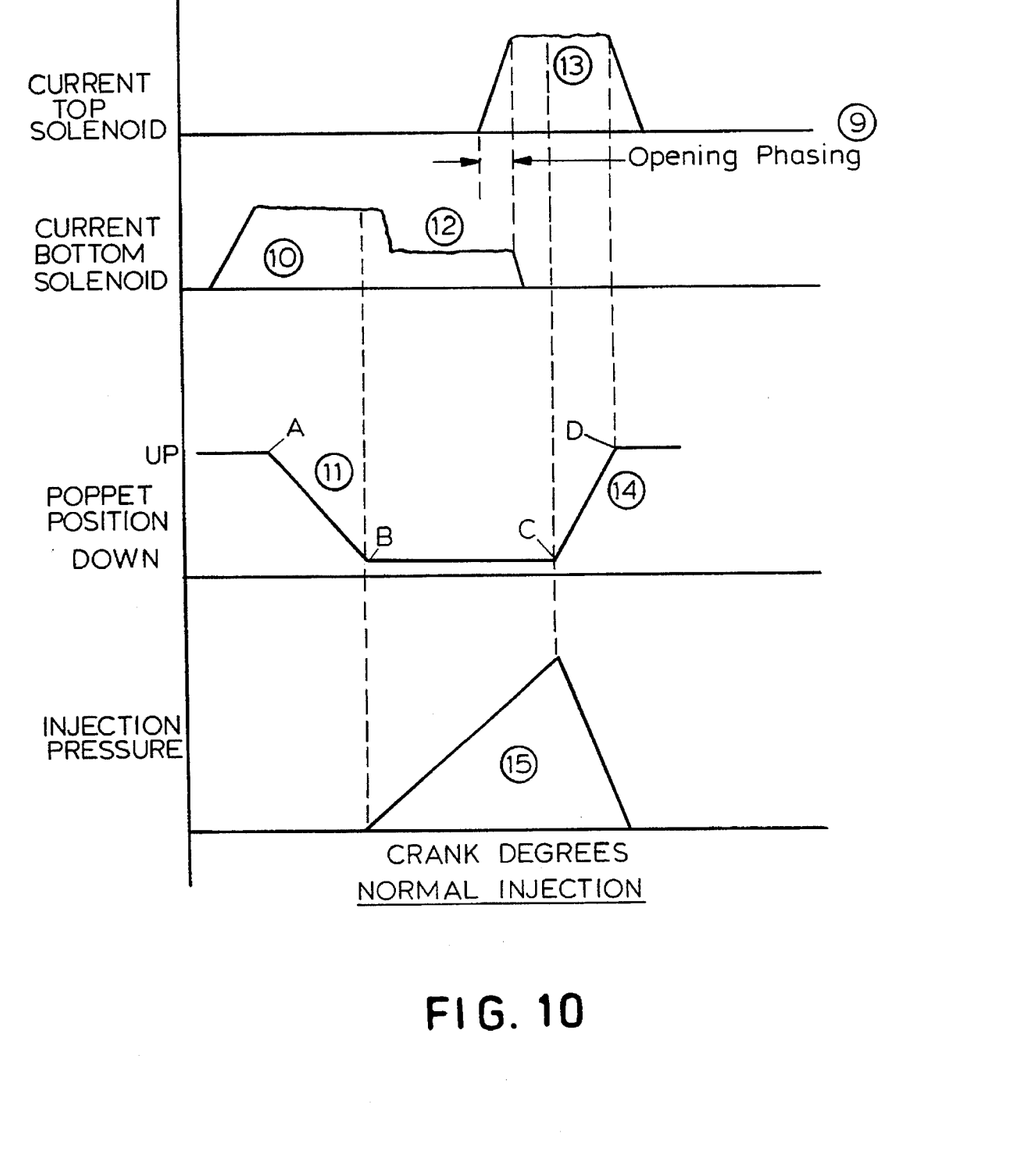
FIG. 10 is a timing diagram illustrating solenoid waveforms, poppet valve positions, and a normal fuel injection cycle for the embodiment of FIG. 8.

The operation of the alternative control valve assembly 130 of FIG. 8 will now be described in connection with FIGS. 8 and 10. In the alternative embodiment control valve assembly 130, the poppet valve 174 is maintained in the upper position by the armature 84 being latched to the upper pole piece 132 by means of residual magnetism which creates an upward magnetic force on the armature. As shown in FIG. 10, as current is applied to the lower coil 36, a magnetic field is created which counteracts the residual magnetism and tends to pull the armature 84 downwards, and after a short time the poppet valve 74 will begin to move downwards as indicated at poppet reference position A. When the poppet contacts the valve seat 58 as indicated at poppet reference position B, the current to the lower coil is reduced to provide a smaller holding current level which reduces electrical power consumption. This lower holding current level also decreases the time required for the magnetic field to decay from the lower coil at the end of injection. Furthermore, this reduces the time required from the end of current of the lower coil until the poppet starts to open, thereby reducing the time required for a complete injection cycle.

The injection pressure begins to build starting at poppet reference position B in order to supply a normal fuel injection cycle. To discontinue the injection, the operating voltage is shut off to the lower coil. An operating voltage is applied to the upper coil 34 which tends to move armature 84 upward, and after a short time the poppet will begin to move upwards as indicated at poppet reference position C leading to a drop off in the injection pressure. Current to the upper coil 34 continues until the armature 84 contacts the upper pole piece 132 which creates a zero air gap or latching condition. This magnetic latch force holds the armature 84 up against the pole piece 132 with the poppet now maintained at poppet reference position D.

Split injection can also be accomplished using the alternative control valve assembly 130 of FIG. 8 by the use of concurrent operation.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A fluid pressure control valve assembly adapted for a fuel injector capable of injecting fuel during a fuel injection cycle, said control valve assembly comprising:

a valve body with fluid inlet and fluid outlet ports;

a valve seat communicating with said fluid inlet and said fluid outlet ports;

a poppet valve slidably mounted in said valve body between opposite respective fuel injection and non-fuel injection poppet valve positions controlling said fluid inlet and said fluid outlet ports through said valve seat;

means for maintaining said poppet valve in said opposite respective poppet valve positions;

first and second electrical actuators selectively operably energized for releasing said poppet valve from one of said poppet valve positions and for moving said poppet valve to the other of said poppet valve positions; and means for selectively energizing said electrical actuators to provide at least two separate fuel injections during said fuel injection cycle.

2. A control valve assembly according to claim 1, wherein said means for maintaining said poppet valve in said opposite respective poppet valve positions includes a permanent magnet for at least one of said poppet valve positions.

3. A control valve assembly according to claim 2, including a second permanent magnet for the other of said poppet valve positions.

4. A control valve according to claim 1, wherein said means for maintaining said poppet valve in said opposite respective poppet valve positions includes residual magnetism means for at least one of said poppet valve positions.

5. A control valve assembly according to claim 4, wherein one of said electrical actuators is a solenoid and including solenoid holding current for maintaining said poppet valve in the other of said poppet valve positions.

6. A control valve assembly according to claim 1, wherein the first of said fuel injections during said fuel injection cycle supplies significantly less fuel over a smaller portion of said cycle compared to the second of said fuel injections.

7. A fluid pressure control valve assembly for a fuel injector comprising:

a valve body with fluid inlet and fluid outlet ports;

a valve seat communicating with said fluid inlet and said fluid outlet ports;

a poppet valve slidably mounted in said valve body between opposite respective fuel injection and non-fuel injection poppet valve positions controlling said fluid inlet and said fluid outlet ports through said valve seat;

permanent magnet means coupled to said poppet valve forming suitable magnetic forces for latching said poppet valve in said opposite respective poppet valve positions;

first and second electrical actuators operably energized for forming suitable counter magnetic forces to said permanent magnet means for releasing said poppet valve from one of said poppet valve positions and for moving said poppet valve to the other of said poppet valve positions; and means for selectively energizing said electrical actuators to provide at least two separate fuel injections during said fuel injection cycle.

8. A fluid pressure control valve assembly adapted for a fuel injector providing a fuel injection cycle comprising:

a valve body with fluid inlet and fluid outlet ports;

a valve seat communicating with said fluid inlet and said fluid outlet ports, and including a flat seating surface;

a poppet valve slidably mounted in said valve body between respective poppet valve positions, with one poppet end having a poppet end portion including a concave end portion for sealingly engaging said flat seating surface of said valve seat to block said fluid inlet;

a first permanent magnet adapted for mounting at the other poppet end setting up a first magnetic force for holding said poppet valve in one of said poppet valve positions;

a first electrical actuator adapted for mounting at the other poppet end and operably energized for setting up a first counter-magnetic force to said first magnetic force tending to release said poppet valve from said one poppet valve position;

a second electrical actuator adapted for mounting at the other poppet end and operably energized for setting up a second counter-magnetic force to said first magnetic force for moving said poppet valve into said sealing engagement with said valve seat at said other poppet valve position; and a second permanent magnet adapted for mounting at the other poppet end setting up a second magnetic force for holding said poppet valve in said other poppet valve position.

9. A control valve assembly according to claim 8, including return means for returning said poppet valve from said other poppet valve position to said one poppet valve position, said return means including energizing said second electrical actuator for setting up a reverse magnetic force to said second magnetic force tending to release said poppet valve from said other poppet valve position.

10. A control valve assembly according to claim 9, said return means including energizing said first electrical actuator for setting up a reverse magnetic force to said second magnetic force for disengaging said poppet end portion from said valve seat and returning said poppet valve to said one valve position where it is held by said first permanent magnet.

11. A control valve assembly according to claim 8, wherein said poppet valve concave end portion includes a knife edge for sealingly engaging said flat seating surface of said valve seat in a flat seat seal on valve closing during pressurized fuel injection and for responding to pressurizing fluid for rapidly opening said poppet valve.

12. A control valve assembly according to claim 8, wherein said fuel injector is a unit fuel pump-injector.

13. A control valve assembly according to claim 8, wherein each of said electrical actuators is a solenoid.

14. A control valve assembly according to claim 8, including means for selectively energizing said electrical actuators to provide at least two separate fuel injections during said fuel injection cycle.

15. A control valve assembly according to claim 14, wherein the first of said fuel injections during said fuel injection cycle supplies significantly less fuel over a smaller portion of said cycle compared to the second of said fuel injections.

16. An electronically-controlled unit fuel pump-injector providing a fuel injection cycle comprising:

an injector body having a fuel inlet and a fuel outlet;

a fuel injection pumping assembly, including a nozzle receiving fuel from said fuel inlet for injecting said fuel under pressure from said pumping assembly;

a control valve assembly for controlling the injecting of said fuel, said control valve assembly including a valve body with a valve seat having a valve seat inlet connected to said injector body fuel outlet and having a drain fuel outlet;

said control valve assembly including, a poppet valve slidably mounted in said valve body between opposite respective fuel injection and non-fuel injection poppet valve positions controlling said fuel inlet and said fuel outlet through said valve seat;

means for maintaining said poppet valve in said opposite respective poppet valve positions;

first and second electrical actuators selectively operably energized for releasing said poppet valve from one of said poppet valve positions and for moving said poppet valve to the other of said poppet valve positions; and means for selectively energizing said electrical actuators to provide at least two separate fuel injections during said fuel injection cycle.

17. An electronically-controlled unit fuel pump-injector according to claim 16, wherein said means for maintaining said poppet valve in said opposite respective poppet valve positions includes a permanent magnet for at least one of said poppet valve positions.

18. An electronically-controlled unit fuel pump-injector according to claim 17, including a second permanent magnet for the other of said poppet valve positions.

19. An electronically-controlled unit fuel pump-injector according to claim 16, wherein said means for maintaining said poppet valve in said opposite respective poppet valve positions includes residual magnetism means for at least one of said poppet valve positions.

20. An electronically-controlled unit fuel pump-injector according to claim 19, wherein one of said electrical actuators is a solenoid and including solenoid holding current for maintaining said poppet valve in the other of said poppet valve positions.

21. An electronically-controlled unit fuel pump-injector according to claim 16, wherein the first of said fuel injections during said fuel injection cycle supplies significantly less fuel over a smaller portion of said cycle compared to the second of said fuel injections.

22. An electronically-controlled fuel injector system comprising:

an injector body having a fuel inlet and a fuel outlet;

a fuel injection pumping assembly, including a nozzle receiving fuel from said fuel inlet for injecting said fuel under pressure from said pumping assembly;

a pressure control valve assembly for controlling the injecting of said fuel, said control valve assembly including a valve body with a valve seat having a valve seat inlet connected to said injector body fuel outlet and having a drain fuel outlet; said pressure control valve assembly including, a poppet valve slidably mounted in said valve body between said opposite respective fuel injection and non-fuel injection poppet valve positions controlling said fuel inlet and said fuel outlet through said valve seat;

means for maintaining said poppet valve in said opposite respective poppet valve positions;

first and second electrical actuators selectively operably energized for releasing said poppet valve from one of said poppet valve positions and for moving said poppet valve to the other of said poppet valve positions; and means for selectively energizing said electrical actuators to provide at least two separate fuel injections during said fuel injection cycle.

23. An electronically-controlled fuel injector system according to claim 22, wherein said means for maintaining said poppet valve in said opposite respective poppet valve positions includes a permanent magnet for at least one of said poppet valve positions.

24. An electronically-controlled fuel injector system according to claim 23, wherein each of said electrical actuators is a solenoid.

25. An electronically-controlled fuel injector system according to claim 22, wherein said means for maintaining said poppet valve in said opposite respective poppet valve positions includes residual magnetism means for at least one of said poppet valve positions.

26. An electronically-controlled fuel injector system according to claim 25, wherein one of said electrical actuators is a solenoid and including solenoid holding current for maintaining said poppet valve in the other of said poppet valve positions.

27. An electronically-controlled fuel injector system according to claim 22, wherein said at least two fuel injections comprise a small amount of fuel followed by a much larger amount of fuel.

28. A fluid pressure control valve assembly adapted for a fuel injector providing a fuel injection cycle comprising:
   a valve body with fluid inlet and fluid outlet ports;
   a valve seat communicating with said fluid inlet and said fluid outlet ports;
   a poppet valve slidably mounted in said valve body between respective poppet valve positions, with one poppet end portion sealingly engagable with said valve seat to block said fluid inlet;
   a first permanent magnet adapted for mounting at the other poppet end portion setting up a first magnetic force for holding said poppet valve in one of said poppet valve positions;
   a first electrical actuator adapted for mounting at the other poppet end portion and operably energized for setting up a first counter-magnetic force to said first magnetic force tending to release said poppet valve from said one poppet valve position;
   a second electrical actuator adapted for mounting at the other poppet end portion and operably energized for setting up a second counter-magnetic force to said first magnetic force for moving said poppet valve into said sealing engagement with said valve seat at said other poppet valve position;
   a second permanent magnet adapted for mounting at the other poppet end portion setting up a second magnetic force for holding said poppet valve in said other poppet valve position; and
   means for selectively energizing said electrical actuators to provide at least two separate fuel injections during said fuel injection cycle.

29. A control valve assembly according to claim 28, including return means for returning said poppet valve from said other poppet valve position to said one poppet valve position, said return means including energizing said second electrical actuator for setting up a reverse magnetic force to said second magnetic force tending to release said poppet valve from said other poppet valve position.

30. A control valve assembly according to claim 29, said return means including energizing said first electrical actuator for setting up a reverse magnetic force to said second magnetic force for disengaging said poppet end portion from said valve seat and returning said poppet valve to said one valve position where it is held by said first permanent magnet.

31. A control valve assembly according to claim 28, wherein said fuel injector is a unit fuel pump-injector.

32. A control valve assembly according to claim 28, wherein each of said electrical actuators is a solenoid.

33. A control valve assembly according to claim 28, wherein the first of said fuel injections during said fuel injection cycle supplies significantly less fuel over a smaller portion of said cycle compared to the second of said fuel injections.

34. A fluid pressure control valve assembly adapted for a fuel injector capable of injecting fuel during a fuel injection cycle, said control valve assembly comprising:
   a valve body with fluid inlet and fluid outlet ports;
   a valve seat communicating with said fluid inlet and said fluid outlet ports;
   a poppet valve slidably mounted in said valve body between opposite respective fuel injection and non-fuel injection poppet valve positions controlling said fluid inlet and said fluid outlet ports through said valve seat;
   means for maintaining said poppet valve in said opposite respective poppet valve positions including residual magnetism means for at least one of said poppet valve positions; and
   first and second electrical actuators selectively operably energized for releasing said poppet valve from one of said poppet valve positions and for moving said poppet valve to the other of said poppet valve positions.

35. A control valve assembly according to claim 34, wherein one of said electrical actuators is a solenoid and including solenoid holding current for maintaining said poppet valve in the other of said poppet valve positions.

36. An electronically-controlled unit fuel pump-injector providing a fuel injection cycle comprising:
   an injector body having a fuel inlet and a fuel outlet;
   a fuel injection pumping assembly, including a nozzle receiving fuel from said fuel inlet for injecting said fuel under pressure from said pumping assembly;
   a control valve assembly for controlling the injecting of said fuel, said control valve assembly including a valve body with a valve seat having a valve seat inlet connected to said injector body fuel outlet and having a drain fuel outlet;
   said control valve assembly including,
   a poppet valve slidably mounted in said valve body between opposite respective fuel injection and non-fuel injection poppet valve positions controlling said fuel inlet and said fuel outlet through said valve seat;
   means for maintaining said poppet valve in said opposite respective poppet valve positions including residual magnetism means for at least one of said poppet valve positions; and
   first and second electrical actuators selectively operably energized for releasing said poppet valve from one of said poppet valve positions and for moving said poppet valve to the other of said poppet valve positions.

37. An electronically-controlled unit fuel pump-injector according to claim 36, wherein one of said electrical actuators is a solenoid and including solenoid holding current for maintaining said poppet valve in the other of said poppet valve positions.

* * * * *